United States Patent
Yufit et al.

(10) Patent No.: US 10,447,353 B2
(45) Date of Patent: Oct. 15, 2019

(54) SYSTEM AND METHOD FOR SELECTING TRANSMISSION PARAMETERS

(71) Applicant: Ceva D.S.P. Ltd., Herzlia Pituach (IL)

(72) Inventors: Alexander Yufit, Holon (IL); Zeev Kaplan, Karmiel (IL); David Levy, Herzliya (IL)

(73) Assignee: CEVA D.S.P. LTD., Herzlia Pituach (IL)

( * ) Notice: Subject to any disclaimer, the term of this patent is extended or adjusted under 35 U.S.C. 154(b) by 22 days.

(21) Appl. No.: 15/723,219

(22) Filed: Oct. 3, 2017

(65) Prior Publication Data

US 2019/0103900 A1   Apr. 4, 2019

(51) Int. Cl.
| | |
|---|---|
| *H04B 7/0413* | (2017.01) |
| *G05B 17/02* | (2006.01) |
| *H04B 14/00* | (2006.01) |
| *H04L 25/02* | (2006.01) |
| *H04B 7/06* | (2006.01) |

(Continued)

(52) U.S. Cl.
CPC ........... *H04B 7/0413* (2013.01); *G05B 17/02* (2013.01); *G06N 3/02* (2013.01); *G06N 7/005* (2013.01); *H04B 7/0478* (2013.01); *H04B 7/0486* (2013.01); *H04B 7/0608* (2013.01); *H04B 14/004* (2013.01); *H04L 1/0015* (2013.01);

(Continued)

(58) Field of Classification Search
CPC .. H04B 7/0413; H04B 7/0608; H04B 14/004; G05B 17/02; H04L 25/0204
USPC ......................... 370/310, 328, 329
See application file for complete search history.

(56) References Cited

U.S. PATENT DOCUMENTS

| | | |
|---|---|---|
| 8,972,315 B2 | 3/2015 | Botond et al. |
| 2013/0128937 A1 | 5/2013 | Somichetty et al. |

(Continued)

FOREIGN PATENT DOCUMENTS

| | | |
|---|---|---|
| WO | WO-2009/106994 | 9/2009 |
| WO | WO 2016/190971 | 12/2016 |

OTHER PUBLICATIONS

Sayana et al. "Link Performance Abstraction based on Mean Mutual Information per Bit (MMIB) of the LLR Channel", IEEE 802.16 Broadband Wireless Access Working Group, May 2, 2007, pp. 1-22.

(Continued)

*Primary Examiner* — Obaidul Huq
(74) *Attorney, Agent, or Firm* — Pearl Cohen Zedek Latzer Baratz LLP

(57) ABSTRACT

A system and method for MIB estimation including generating a signal model for rank=2, based on the reference signals of a received wireless signal; converting the signal model to a four-parameter representation; determining, for values of parameters derived from the four-parameter representation, whether mutual information per bit (MIB) values depend on a single parameter or on a plurality of parameters; if the MIB values depend on the single parameter, calculating MIB values based on the single parameter; and if the MIB values depend on the plurality of parameters, calculating MIB values based on the plurality of parameters. Calculating MIB values based on the single parameter, determining, whether MIB values depend on a single parameter or on a plurality of parameters and, calculating MIB values based on the plurality of parameters, are performed using a machine learning algorithm.

18 Claims, 5 Drawing Sheets

(51) Int. Cl.
  *G06N 3/02* (2006.01)
  *G06N 7/00* (2006.01)
  *H04B 7/0456* (2017.01)
  *H04L 1/00* (2006.01)

(52) U.S. Cl.
  CPC ........ *H04L 1/0026* (2013.01); *H04L 25/0204* (2013.01); *H04L 25/0246* (2013.01)

(56) References Cited

U.S. PATENT DOCUMENTS

2015/0003275 A1* 1/2015 Krishnamurthy ..... H04L 1/0026
  370/252
2017/0104774 A1  4/2017 Vasseur et al.

OTHER PUBLICATIONS

ETSI, "LTE; Evolved Universal Terrestrial Radio Access (E-UTRA); Physical layer procedures (3GPP TS 36.213 version 13.0.0 Release 13)", May 2016, pp. 1-328.

Mediatek Inc: System modeling methodology for reduced-complexity ML/R-ML receivers. 3gpp Draft; R1-134451 Link Abstraction for R-ML Receivers, 3rd Generation Partnership Project (3GPP) vol. RAN WG1, No. Guangzhou, China; Oct. 7, 2013-Oct. 11, 2013, Sep. 28, 2013 XP050717568, Retrieved from the Internet: URL: http://www.3gpp.org/ftp/tsg/_ran/WG1_RL 1/TSGR_74b/Docs/.

Search Report of EP Application No. 18 19 8390, dated Feb. 25, 2019.

* cited by examiner

SYSTEM AND METHOD FOR SELECTING TRANSMISSION PARAMETERS

FIELD OF THE INVENTION

The present invention relates generally to the field of transmission parameters selection for radio communication over multiple-input-multiple-output (MIMO) channel, for example to estimate mutual information per bit (MIB).

BACKGROUND

According to Long Term Evolution (LTE) standards a base station (eNodeB) may transmit channel state information-reference signals (CSI-RS), or cell-specific reference signals (C-RS) reference signals, to a user equipment (UE, e.g. a cellular telephone or other device) and request the UE to estimate a preferred set of transmission (TX) parameters. The set of TX parameters may include for example:
  RI—MIMO rank indication, which indicates the number of layers that should be used for downlink (DL) transmission to the UE.
  PMI—pre-coder matrix indication.
  CQI—channel quality indication that defines the constellation, e.g., quadrature phase-shift keying (QPSK), 16 Quadrature amplitude modulation (QAM), 64 QAM and 256 QAM, and code rate.

The UE may report to the base station a TX parameters vector, e.g., [RI, PMI, CQI] that may maximize DL capacity under a required block error rate (BLER).

In order to choose the best suitable set of TX parameters, a UE should have precise evaluation of the expected link performance under current channel conditions. The UE should report TX parameters that are suitable for high downlink rate transmission. However, the UE must not report TX parameters combination that has block error rate (BLER) above a predefined level, e.g., 0.1. According to the LTE standard, a transport block is divided into smaller size code blocks. BLER may refer to a ratio or portion of the average number of erroneous code-blocks out of total transmitted code-blocks. For example, the UE may report TX parameters that provide the highest downlink rate transmission with BLER equal to or below 0.1.

The process of TX parameters estimation may include estimating the effective channel, $H_{eff}$ based on reference signals received from the base station, e.g., CSI-RS (or C-RS), estimating the mutual information per bit (MIB) or the effective signal-to-noise ratio (SNR), $SNR_{eff}$, and estimating the expected BLER based on the MIB or $SNR_{eff}$, for every combination of [RI, PMI, CQI]. The best combination of [RI, PMI, CQI] may be reported to the base station. Mean MIB (MMIB) or effective exponential SNR mapping (EESM) may be seen as metrics that abstract channel conditions and noise.

Known methods for selecting TX parameters, commonly referred to as EESM, may include estimating effective SNR, $SNR_{eff}$, by averaging post-processing SNR (PP-SNR) over all subcarriers, for example according to:

$$SNR_{eff} = -\beta \cdot \ln\left(\frac{1}{N}\sum_{k=1}^{N} e^{-\frac{\gamma_k}{\beta}}\right) \quad \text{(Equation 1)}$$

Where N is the number of sub carriers, $\gamma_k$ is the effective SNR of $k^{th}$ subcarrier and $\beta$ is a parameter calibrated for every code rate and every block size. EESM may predict the performance of a linear MIMO decoder e.g. minimum mean square error (MMSE) or zero-forcing (ZF) decoders accurately, by feeding PP-SNR into $\gamma_k$. PP-SNR may refer to the signal to noise and interference ratio after equalizing MIMO interferences. However, when maximum likelihood decoding (MLD) is used, PP-SNR has no analytic closed form expression or convenient approximation and thus is not known. Using PP-SNR of a linear MIMO decoder (e.g., MMSE or ZF) for predicting MLD performance provides poor results. Thus, for MLD, EESM yields poor prediction of link performance, e.g., of BLER.

According to a second method, given bit log-likelihood ratios (LLRs), outputs of MLD, MIB may be calculated according to:

$$MIB = I(b; LLR) = \sum_{b \in \{0,1\}} \int_{-\infty}^{\infty} P(LLR, b)\log_2\left(\frac{P(LLR, b)}{P(LLR)P(b)}\right)dLLR \quad \text{(Equation 2)}$$

In equation 2, MIB measures the amount of information that the LLRs provide on each bit. Mean MIB (MMIB) is a measure of average MIB values over all constellation bits and over all subcarriers that are received from the current channel. MIB may be averaged over all subcarriers using an arithmetic (simple) averaging:

$$MMIB = \frac{1}{N}\sum_{k=1}^{N} MIB_k \quad \text{(Equation 3)}$$

Where $MIB_k$ is the MIB of $k^{th}$ subcarrier and N is the number of subcarriers.

According to Gaussian mixture model (GMM), it may be assumed that the distribution function of LLRs may be a mixture of Gaussians. For single input single output (SISO) channel and quadrature phase-shift keying (BPSK) modulation, MIB may be represented by:

$$MIB = J\left(\sqrt{8\frac{E_s}{N_0}}\right) \quad \text{(Equation 4)}$$

where:

$$j(\sigma) = 1 - \int_{-\infty}^{\infty} \frac{1}{\sqrt{2\pi}\,\sigma} e^{-\frac{(z-\sigma^2/2)^2}{\sigma^2}} \cdot \log(1 + e^{-z})dz \quad \text{(Equation 5)}$$

For higher constellations and MIMO channels, LLRs may be approximated by a mixture of several Gaussians and MIB may be represented by:

$$MIB = c1*J(a\sqrt{\gamma_1}) + c2*J(b\sqrt{\gamma_2}) + c3*J(c\sqrt{\gamma_3}) \quad \text{(Equation 6)}$$

Where c1, c2 and c3 are coefficients that depend on the constellation. $\gamma_1$, $\gamma_2$ and $\gamma_3$ are derived from Eigen values of the channel matrix and a, b and c are pre-calibrated coefficients. However, the GMM model is difficult to calibrate and achieves poor performance when applied to MIMO channels with high correlation between MIMO layers.

Thus, an efficient method for calculating MIB for MIMO channels is required.

SUMMARY OF THE INVENTION

According to some embodiments of the invention, there is provided a method and system for estimation of MIB. Some embodiments of the invention may include: a. generating a signal model for rank=2, based on reference signals of a received wireless signal; b. converting the signal model to a four-parameter representation based on QR decomposition of the effective channel matrix; c. determining, based on the four-parameter representation, whether MIB values depend on a single parameter or on a plurality of parameters; d. if the MIB values depend on the single parameter, calculating MIB values based on the single parameter; and e. if the MIB values depend on the plurality of parameters, calculating MIB values based on the plurality of parameters. Some embodiments of the invention may further include repeating operations c-e for a plurality of CQIs; repeating operations a-e for a plurality of PMIs; estimating required BLER values for combinations of PMI and CQI for rank=2 based on the calculated MIB values; estimating BLER values for combinations of PMI and CQI for rank=1; and selecting a combination of RI, PMI and CQI that provides a maximal expected throughput for which BLER is not greater than a predetermined value.

According to some embodiments of the invention, calculating MIB values based on the single parameter, determining, whether MIB values depend on a single parameter or on a plurality of parameters and, calculating MIB values based on the plurality of parameters, may be performed using a machine learning algorithm e.g., artificial neural networks (ANN). According to some embodiments of the invention, an artificial neural network may provide a plurality of the MIB values in parallel.

Some embodiments of the invention may further include: reporting the selected combination of RI, PMI and CQI to the base station; and receiving data transmitted from the base station using the selected combination of RI, PMI and CQI.

According to some embodiments of the invention, the wireless signal may be transmitted over a MIMO channel.

According to some embodiments of the invention, there is provided a method and system for estimation of MIB. Some embodiments of the invention may include: a. generating a signal model for rank=2, based on reference signals of a received wireless signal; b. converting the signal model to a four-parameter representation by QR decomposition of the effective channel matrix; c. calculating MIB values based on parameters taken from the four-parameter representation using an artificial neural network.

Some embodiments of the invention may include: repeating operation c for a plurality of CQIs; repeating operations a-c for a plurality of PMIs; estimating required BLER values for combinations of PMI and CQI for rank=2 based on the calculated MIB values; estimating BLER values for combinations of pre-coder matrix indications (PMI) and channel quality indication (CQI) for rank=1; selecting a combination of RI, CQI and PMI that provides a maximal expected throughput for which BLER is not greater than a predetermined value; reporting the selected combination of RI, CQI and PMI to the base station; and receiving data transmitted from the base station using the selected combination of RI, CQI and PMI.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
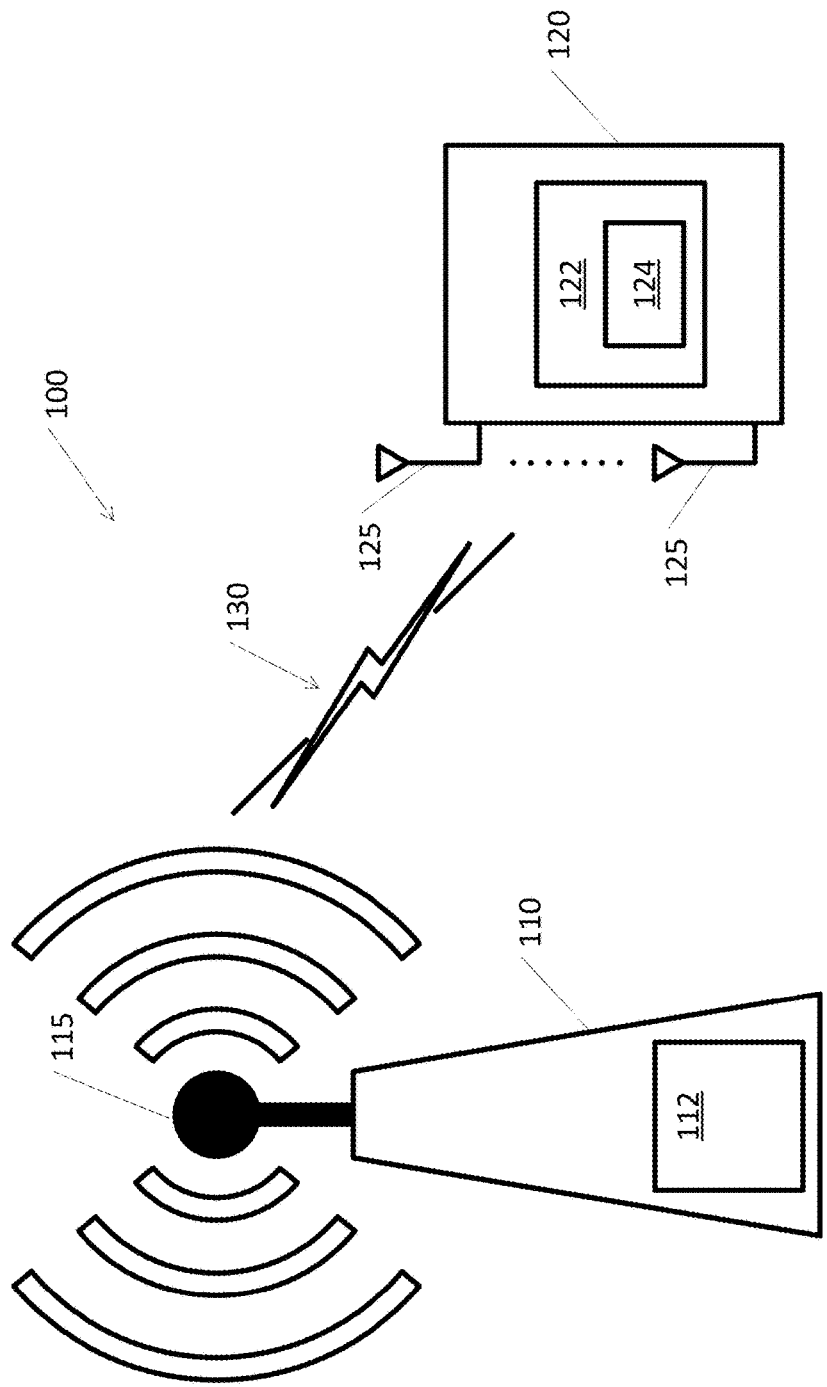
FIG. 1 is a schematic illustration of an exemplary cellular communication system, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices, or VLSI logic circuits.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Embodiments of the present invention provide an efficient method for MIB approximation or estimation for rank-2

MIMO channels. Embodiments of the invention may use machine learning algorithms, e.g., artificial neural networks (ANN), for estimating MIB. According to some embodiments of the invention, a machine learning algorithm may receive four parameters related to a rank-2 MIMO channel as inputs, and provide a plurality of MIB values. According to some embodiments, a classifier may receive three out of the four parameters and may divide the four parameters into two sections. For the first section MIB may be determined based on a single parameter only (out of the four parameters), while for the second section MIB may be determined based on the four parameters. Determining MIB based on a single parameter may be performed analytically or by a machine learning algorithm, and may be much less computationally intensive than determining MIB based on four parameters. Although a stage of classifier is added, the whole process is less computationally intensive than all other methods for performing MIB approximation, while being sufficiently accurate. MIB estimations should be accurate enough to reduce the probability of selecting non-optimal TX parameters. Non-optimal TX parameters may reduce achievable throughput or DL capacity.

Embodiments of the present invention will be given with reference LTE Rel. 13. However, it will be apparent to these skilled in the art that embodiments of the present invention are not limited in this regard. Embodiments of the present invention may apply to other communication standards, or other releases of the LTE standards.

Reference is now made to FIG. 1 which is a schematic illustration of an exemplary cellular communications system 100, according to embodiments of the invention. Cellular communications system 100 includes a base station 110, e.g., an eNodeB or another device, of a radio communications cell, and UE 120. UE 120 may be any device used to communicate over a wireless (e.g., radio) communication network. UE 120 may be or may include, for example, computing devices having mobile broadband communication capabilities, e.g., a hand-held or cellular telephone or smartphone, a laptop computer equipped with a mobile broadband adapter, an IoT device or a Machine Type Communication (MTC) device, e.g., environment or industrial remote sensors, domestic sensors, wearables, etc. As is apparent to one of ordinary skill in the art, base station 110 and UE 120 are not drawn to scale and are illustrative only.

UE 120 may include a transceiver 122 and one or more antennae 125 for transmitting and receiving cellular communications signals, e.g., transmission 130 to base station 110. Base station 110 may include a transceiver 112 and a plurality of antennae 115 for transmitting and receiving cellular communications signals, e.g., transmission 130, to UE 120. Base station 110 may transmit reference signals, e.g., CSI-RS (or C-RS) and allocate channel state information-interference measurement (CSI-IM) resources in UE 120 for estimation a preferred set of TX parameters, e.g., [RI, PMI, CQI] that may maximize DL capacity in presence of inter layer MIMO interference. UE 120 may report the preferred set of TX parameters to base station 110.

A rank-2 MIMO scheme may utilize spatial multiplexing for transmitting a 2×1 vector s from transmitting antennae 115 over two MIMO layers. At the receiver side 125 a received vector is represented by y. The relationship between the transmitted vector s and the received vector y defines the signal model, which may be represented by an effective channel matrix $He_{\mathit{eff}}$ as follows:

$$y = H_{\mathit{eff}} s + n \quad n \sim CN(0, \sigma^2)$$ (Equation 7)

Effective channel matrix $H_{\mathit{eff}}$ has dimension of $N_{RX} \times 2$ where $N_{RX}$ is the number of receive antennae 125. For rank-2 spatial multiplexing, the number of transmit antenna 115, $N_{TX}$, and of receive antenna $N_{RX}$ must be at least 2. A physical channel matrix H may include entries $h_{i,j}$ that represent the relationship between the signals transmitted from the $j^{th}$ transmit antenna 115 to the signal received at the $i^{th}$ receive antenna 125. The precoding matrix P may include entries $p_{i,j}$ that represent the relationship between the $j^{th}$ MIMO layer and $i^{th}$ transmit antenna 115. According to the above definition $H_{\mathit{eff}} = H \cdot P$. The dimension of the transmit vector s is 2×1, the dimension of the received vector y is $N_{RX} \times 1$, the dimension of the physical channel matrix H is $N_{RX} \times N_{TX}$, and n is a signal noise vector of dimension $N_{RX} \times 1$ for rank-2 MIMO system, wherein the distribution function of n may be a complex Gaussian (CN), with zero mean, standard deviation $\sigma$, and variance $\sigma^2$. For brevity, the effective channel matrix $H_{\mathit{eff}}$ will be referred to hereinafter as H. Other dimensions and definitions may be used.

Figure 2:
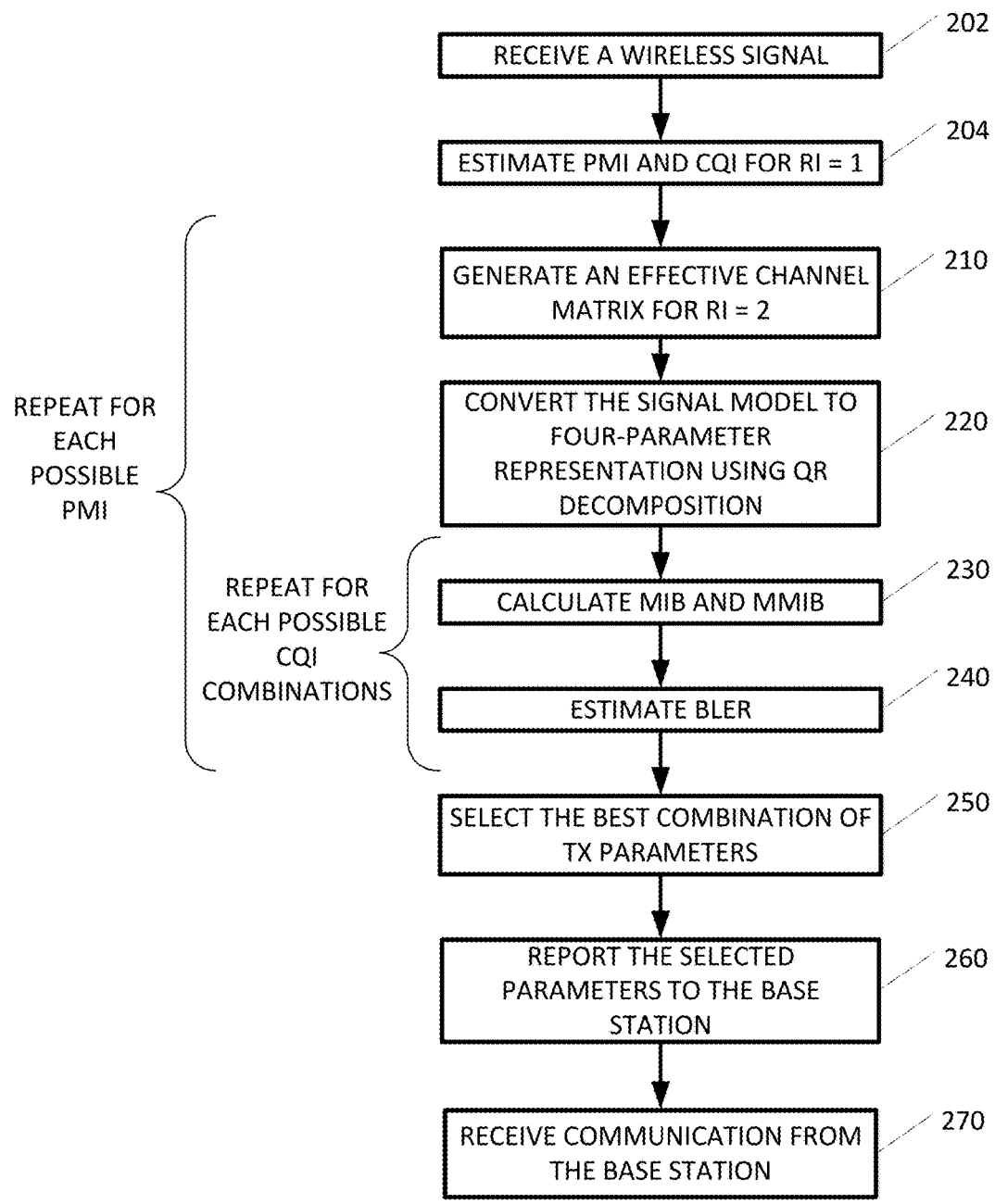
FIG. 2 is a flowchart diagram illustrating a method for selecting a combination of TX parameters, [RI, PMI, CQI], according to embodiments of the invention.

Reference is now made to FIG. 2 which is a flowchart diagram illustrating a method for selecting a combination of TX parameters, [RI, PMI, CQI], according to embodiments of the invention. In some embodiments, a method for selecting a combination of TX parameters, may be performed by a processor (e.g., processor 610 depicted in FIG. 6) and initiated by a set of commands or instructions or by a chip, an integrated circuit (IC) or dedicated hardware logic (VLSI). According to some embodiments, a method for MIB estimation may be performed by a UE, for example, UE 120.

In operation 202, a wireless signal (e.g., radio signal) may be received by the UE. The wireless signal may include reference signals, e.g., CSI-RS (or C-RS) and an allocation of CSI-IM in the UE. The wireless signal may be preprocessed as known in the art. For example, the wireless signal may be equalized.

In operation 204 PMI and CQI that maximize channel efficiency for rank=1 may be estimated or selected. Maximizing channel efficiency may refer to maximizing DL capacity under a required BLER. For example, BLER values for combinations of PMI and CQI (e.g., for all constellations and code rates) for rank=1 may be calculated or estimated according to any applicable method, and PMI and CQI that maximize channel efficiency may be selected. For example, operation 204 may include generating a signal model for rank=1 and solving a single parameter MIB estimation problem, similarly to equations 4 and 5 presented herein.

In operation 210, a signal model, or an effective channel matrix H, of the channel for rank=2 may be generated based on reference signals received from the base station, e.g., CSI-RS or C-RS, according to any applicable method as known in the art. In some embodiments, the noise may be whitened by multiplying the effective channel matrix H by a whitening matrix. As used herein, a whitening may refer to a process that transforms the noise, n, into white noise. According to some embodiments the wireless signal conforms to the LTE standard and is QAM modulated. In some embodiments, other modulations may be used. For this phase of the calculation, it is assumed that the wireless signal is transmitted over a rank-2 MIMO channel.

In operation 220, the signal model of the channel may be converted to a four-parameter representation, using QR decomposition and noise normalization. Noise normalization, e.g., dividing equation 7 by $\sigma$, would result in:

$$\frac{y}{\sigma} = \frac{H}{\sigma} s + \tilde{n} \quad \tilde{n} \sim CN(0,1)$$ (Equation 8)

Using QR decomposition, the effective channel matrix H may be decomposed into matrices Q and R, such that: $H = Q_{nRx \times 2} R_{2 \times 2}$. Matrix $Q$ is unitary such that: $Q^{-1} = Q^H$ ($Q^H Q = 1$):

$$Q^H \frac{y}{\sigma} = \frac{R}{\sigma} s + \tilde{n} \quad \tilde{n} \sim CN(0,1) \qquad \text{(Equation 9)}$$

where matrix R is an upper triangular matrix (e.g. having real entries along its main diagonal):

$$\tilde{R} = \frac{R}{\sigma} = \begin{bmatrix} r_{11} & r_{12} \\ 0 & r_{22} \end{bmatrix} \qquad \text{(Equation 10)}$$

$r_{11}$ and $r_{22}$ are real numbers, and $r_{12}$ is a complex number. $r_{12}$ may be presented or converted to polar coordinates and be represented by two real numbers: the absolute value of $r_{12}$, $|r_{12}|$, and the angle of $r_{12}$ $\sphericalangle r_{12}$, so that $\tilde{R}$ would equal:

$$\tilde{R} = \frac{R}{\sigma} = \begin{bmatrix} r_{11} & |r_{12}| e^{j \sphericalangle r_{12}} \\ 0 & r_{22} \end{bmatrix} \qquad \text{(Equation 11)}$$

In some embodiments, the four parameters derived from matrix R of the $Q$R decomposition may be used for approximating MIB. For Example, $[r_{11}, r_{22}, |r_{12}|$ and $\sphericalangle r_{12}]$, or $[\log_2 r_{11}, \log_2 r_{22}, \log_2 |r_{12}|$ and $\sphericalangle r_{12}]$ may be used. In some embodiments, other parameters derived from matrix R of the $Q$R decomposition may be used. $\tilde{R}$ as referred to herein may be for example a four-parameter representation, since the effective channel matrix is represented by four real parameters $[r_{11}, r_{22}, |r_{12}|$ and $\sphericalangle r_{12}]$.

In operation 230, MIB and MMIB may be calculated. According to embodiments of the invention, MIB may be calculated using machine learning algorithms, e.g., ANNs, as disclosed herein. In some embodiments, other machine learning algorithms may be used, for example, parametric models. MIB may be calculated per subcarrier, and MMIB may be calculating by averaging MIB across subcarriers. For example, MIB may be averaged over all subcarriers in an arithmetic (simple) averaging as in equation 3. According to embodiments of the invention, MIB may be calculated for each transmitted bit in each sub carrier.

For rank-2 MIMO when testing the hypothesis of RI=2, it may be assumed that two codewords are being transmitted by the base station, one over each spatial layer. Each codeword may have different CQI. Thus, the CSI procedure may report a separate CQI for each MIMO layer. Thus, a separate MIB value may be calculated for each spatial MIMO layer. When MLD decoder is utilized at the receiver, the MIB value of each spatial layer depends on the QAM constellation type that is used by the other MIMO layer(s). Due to the coupling between MIMO layers, calculation of (Number of QAMs Layer1)×(Number of QAMs Layer2) MIB values per each PMI and per each MIMO layer may be required. For example, when 4 QAM constellation types are allowed e.g. QPSK/16QAM/64QAM/256QAM, and the tested hypothesis is RI=2, then 32 MIB values may be calculated for each possible option of PMI:

32=2(spatial layers)×4(QAM Layer1)×4(QAM Layer2)     (Equation 12)

Figure 3:
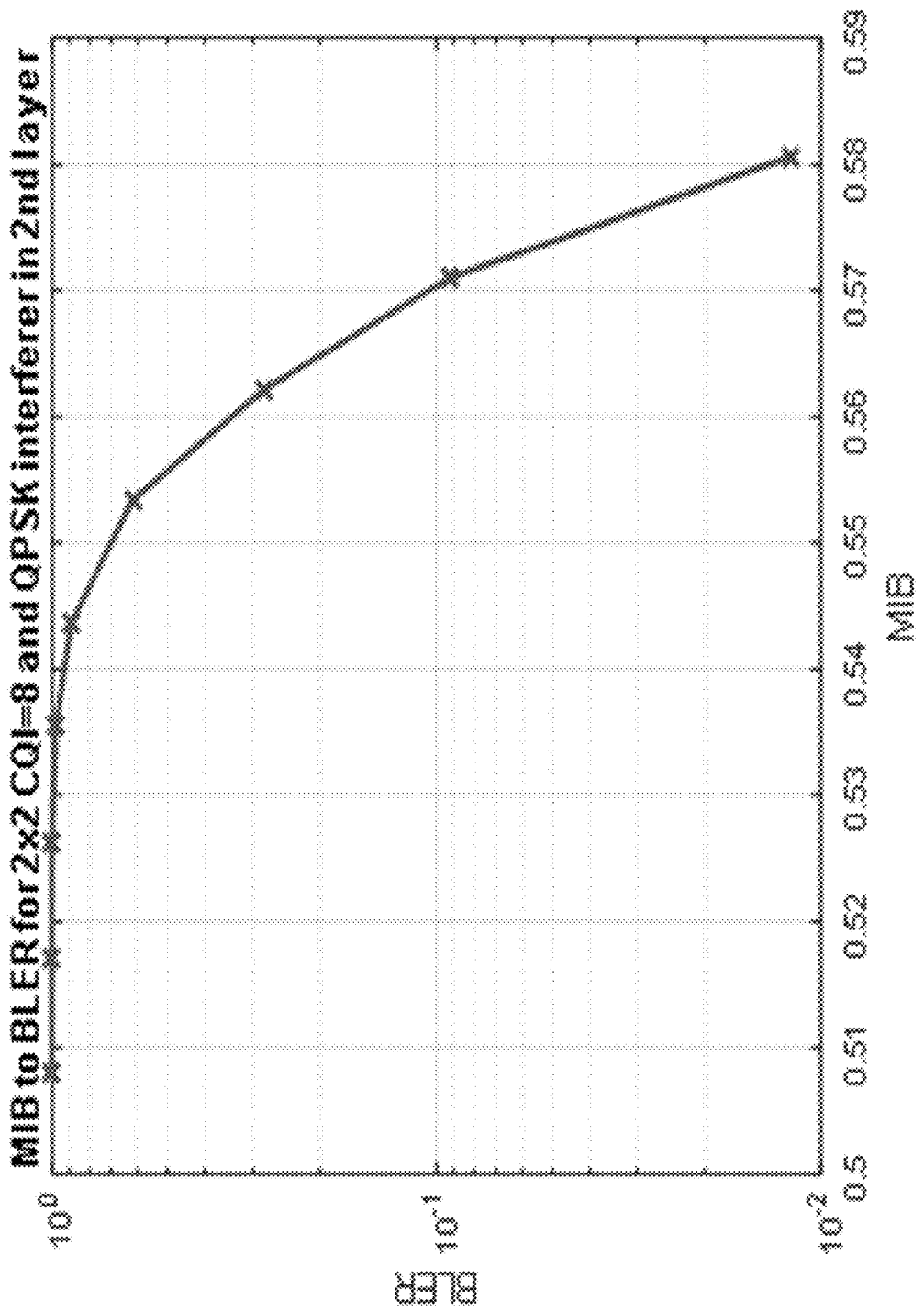
FIG. 3 shows an example of MMIB to BLER mapping function for CQI=8 and QPSK interferer in the $2^{nd}$ MIMO layer, helpful in demonstrating embodiments of the invention.

In operation 240, BLER may be estimated based on MIB values or on MMIB. For example, BLER may be estimated using a MMIB to BLER function or look-up-table (LUT). A MMIB to BLER function (or LUT) may be calibrated in additive white Gaussian noise (AWGN) conditions for every CQI value. FIG. 3 shows an example of MMIB to BLER mapping function for CQI=8 and QPSK interferer in the $2^{nd}$ MIMO layer.

For a given value of PMI operations 230 and 240 may be repeated for each possible combination of CQI. Operations 210-240 may be repeated for all PMI values. In operation 250, the best set of TX parameters may be chosen by comparing the expected throughput of all the available combinations of TX parameters for which BLER is not greater than a predetermined value, e.g., 0.1, and selecting the TX parameters that provide the maximal expected throughput for which BLER is not greater than the predetermined value. In operation 260, the selected TX parameters may be sent or reported to the base station, e.g., to base station 110. In operation 270, data may be transmitted from the base station and received by the UE using the selected TX parameters, RI, PMI and CQI. It is noted that in some embodiments operation 240 may be omitted. For example, MMIB may be calculated in operation 230, and in operation 250 the best set of TX parameters may be chosen by comparing the expected throughput of all the available combinations of TX parameters for which MMIB is smaller than a threshold value that corresponds BLER that is below a predetermined value, e.g., 0.1.

According to some embodiments of the present invention, MIB may be calculated in operation 230 by machine learning algorithms using all four parameters of the matrix R of the QR decomposition. Calculating MIB by machine learning algorithms using all four parameters as referred to herein may be a rank-2 MIMO MIB computation. The machine learning algorithm may receive components of or parameters derived from components of matrix R of the QR decomposition of the effective channel matrix H, e.g., $\log_2 r_{11}$, $\log_2 r_{22}$, $\log_2 |r_{12}|$ (or $r_{11}$, $r_{22}$ and $|r_{12}|$) and, $\sphericalangle r_{12}$, and calculate MIB values. In some embodiments, a plurality of MIB values (e.g., MIB values for a plurality of layers and QAM constellations) may be calculated in parallel. In some embodiments, an ANN may be used. The ANN may receive as inputs $\log_2 r_{11}$, $\log_2 r_{22}$, $\log_2 |r_{12}|$ (or $r_{11}$, $r_{22}$ and $|r_{12}|$) and $r_{12}$, and provide 16 or 32 MIB values in parallel. In some embodiments, the ANN may include several hidden layers (HL) and use non-linear activation function. In some embodiments, a dedicated ANN may be used for each MIMO layer. For example, an ANN with several hidden layers and with a plurality of neurons, 4 inputs and 16 outputs, may be used for each layer. Providing a plurality of MIB values in parallel may reduce the overall computational complexity of MIB calculations thanks to calculations re-use.

Figure 4:
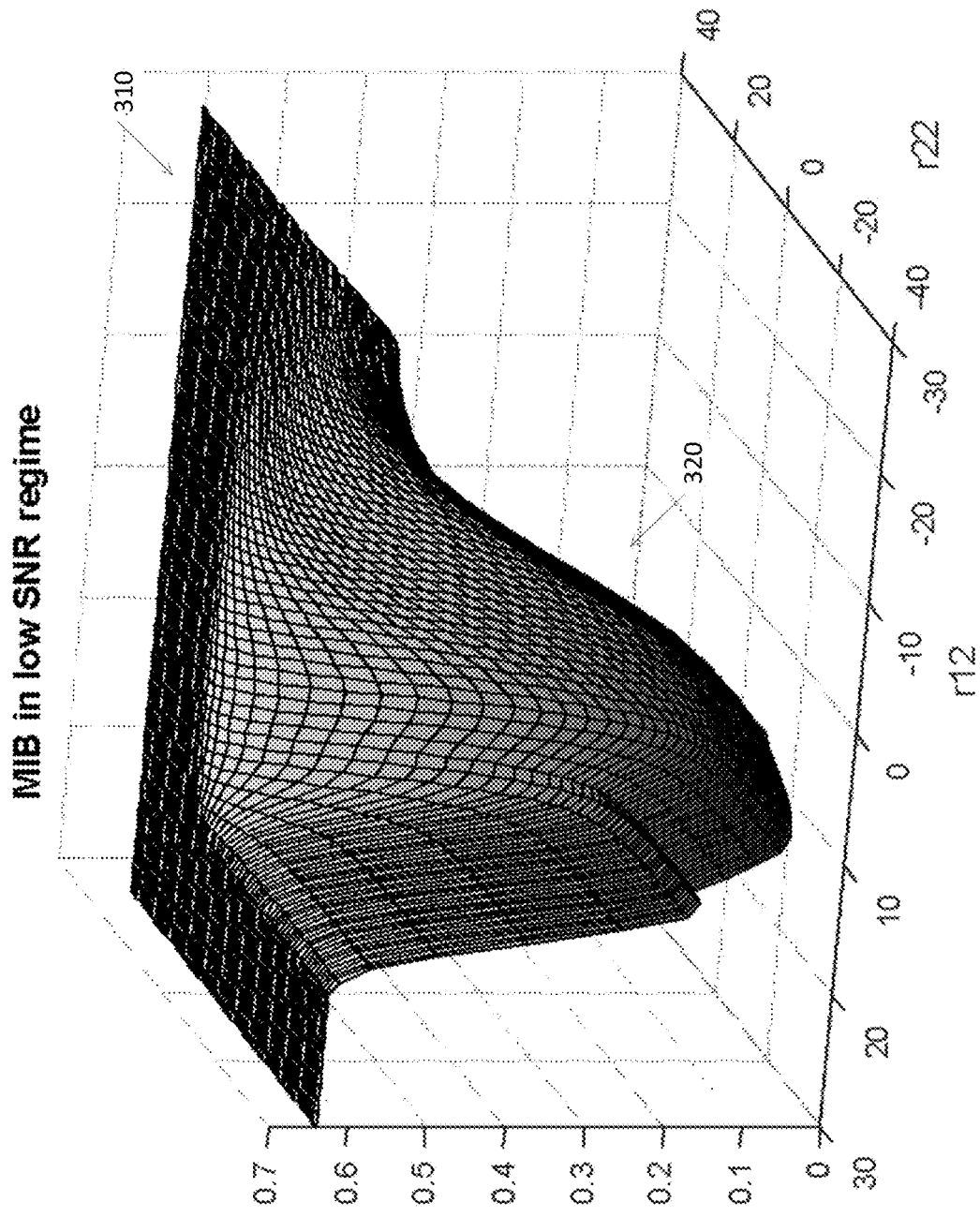
FIG. 4 is an exemplary projection of rank-2 MIMO MIB in low SNR regime, helpful in demonstrating embodiments of the invention.

Reference is now made to FIG. 4 which is an exemplary projection (e.g., holding the value of $r_{11}$ constant) of rank-2 MIMO MIB of a single bit from layer 1, as function of $r_{22}$ and $|r_{12}|$ in low SNR regime, helpful in demonstrating embodiments of the invention. As can be seen in FIG. 4, in some regions, denoted 310 in FIG. 4, MIB values are constant as function of $r_{22}$ and $|r_{12}|$. In these regions MIB values depend or substantially depend on $r_{11}$ only. Thus, MIB values in these regions may be approximated or estimated based on a single parameter, e.g., $r_{11}$. While FIG. 4 presents a single projection only, the same phenomenon repeats for other values of $r_{11}$. Similarly, MIB values are constant as function of $r_{11}$ and $|r_{12}|$ and depend only on values of $r_{22}$ in some areas of rank-2 MIMO MIB of a single bit from layer 2. This phenomenon is used to further reduce the computational complexity of MIB calculations, as disclosed herein. According to some embodiments regions in which MIB values depends on, or are a function of, a single parameter are regions in which inter layer interference is low and MLD performance is governed by the PP-SNR. for example, in regions in which MIB values depend on a single parameter, $r_{11}$ or $r_{22}$ may be related to, or may provide an approximation of PP-SNR. Regions in which MIB values depend on a single parameter as referred to herein may be SISO MIB regions, while regions in which MIB values depend on or are a function of a plurality of parameters as referred to herein may be rank-2 MIMO MIB regions.

Figure 5:
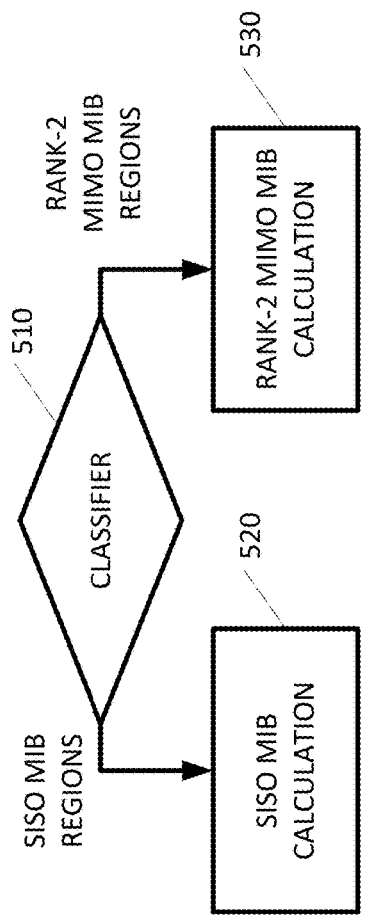
FIG. 5 is a flowchart diagram illustrating a reduced power method for calculating MIB, according to embodiments of the invention.

Reference is now made to FIG. 5 which is a flowchart diagram illustrating a reduced power method for MIB estimation, according to embodiments of the invention. In some embodiments, a method for reduced power MIB estimation, may be performed by a processor (e.g., processor 610 depicted in FIG. 6) and initiated by a set of commands or instructions or by a chip, an integrated circuit (IC) or dedicated hardware logic (VLSI). According to some embodiments, a method for reduced power MIB estimation may be performed by a UE, for example, UE 120. The example reduced power method for MIB estimation presented in FIG. 5 may be an elaboration of operation 230 of FIG. 2.

In operation 510 it may be determined, for values of $r_{11}$, $r_{22}$, $|r_{12}|$ and $\sphericalangle r_{12}$ whether MIB values depend on or are a function of a single parameter or on a plurality of parameters. In some embodiments, the determination may be performed using a classifier. According to some embodiments, the classifier may receive three out of the four parameters, e.g., $r_{11}$, $r_{22}$ and $|r_{12}|$, as inputs and provide a classification. In some embodiments, the classifier may be utilized using a machine learning technique, e.g., an ANN. For example, the ANN may include a plurality of neurons with 3 inputs and 1 output.

Based on the outcome of the classifier, MIB may be calculated as a function of a single parameter, as in operation 520, or as a function of four parameters, as in operation 530. Thus, if it operation 510 determines that the MIB values depend on a single parameter, MIB values may be calculated in operation 520 based on a single parameter, and if operation 510 determines that the MIB values depend on a plurality of parameters, MIB values may be calculated in operation 530 based on the plurality of parameters.

In operation 520 MIB may be calculated as a function of a single parameter. Calculating MIB based a single parameter as referred to herein may be SISO MIB computation. MIB values may be calculated by a parametric model, e.g. for layer 1:

$$\text{SISO\_MIB}(r_{11}) = \begin{cases} a_{12}r_{11}^2 + a_{11}r_{11} + a_{10}, & \text{if } r_{11} > th1 \\ 1 - \exp(a_{22}r_{11}^2 + a_{21}r_{11} + a_{20}), & \text{if } r_{11} \le th1 \end{cases} \quad \text{(Equation 12)}$$

The same parametric model may be used for the second layer since R matrix was normalized by noise standard deviation a as described before. MIB for layer 2 may be calculated by:

$$\text{SISO\_MIB}(r_{22}) = \begin{cases} a_{12}r_{22}^2 + a_{11}r_{22} + a_{10}, & \text{if } r_{22} > th1 \\ 1 - \exp(a_{22}r_{22}^2 + a_{21}r_{22} + a_{20}), & \text{if } r_{22} \le th1 \end{cases} \quad \text{(Equation 13)}$$

The values of $a_{ij}$ and th1 may be predetermined using any applicable method. For example, a vector of coefficients 'a' and th1 may be calculated by solving least square (LS) optimization problem:

$$a = \operatorname{argmin} \|\text{MIB}_{sim} - \text{SISO\_MIB}(a)\|^2 \quad \text{(Equation 14)}$$

Where $\text{MIB}_{sim}$ is an actual or expected MIB value (e.g., received from simulation for the same channel conditions). Equation 14 may be solved utilizing any iterative optimization method such as Gradient Descent or Conjugate Gradients or another suitable method.

In some embodiments, MIB in operation 520 may be calculated using a machine learning algorithm, e.g., ANN that may be trained to receive $r_{11}$ for providing layer 1 MIBs and $r_{22}$ for providing layer 2 MIBs.

In operation 530 MIBs are calculated based on all four inputs, e.g., $r_{11}$, $r_{22}$, $|r_{12}|$ and $\sphericalangle r_{12}$, using rank-2 MIMO MIB computation as disclosed herein.

Calculating MIB using the reduced power method for MIB estimation presented in FIG. 5 may in some embodiments reduce the overall computational complexity of the MIB calculations by up to 40% comparing to rank-2 MIMO MIB computation. Calculating SISO MIB is much less computationally intensive compared with rank-2 MIMO MIB. Thus, although a classification stage is added in the reduced power method for MIB estimation presented in FIG. 5, the overall computational complexity decreases since the classifier depends on three parameters instead of four, and a significant part of the MIB function fulfils the conditions of SISO MIB calculation. In addition, the classifier and the SISO MIB may be computed by relatively simple ANNs. In the following example that is based on a computer simulation, the complexity of calculating 16 MIB results (e.g., results of a single MIMO layer) using only rank-2 MIMO MIB computation, or using the reduced power method for MIB estimation of FIG. 5 are compared. In this example, 60% of the MIB values fulfil the conditions for SISO MIB calculation, and the classifier successfully detects 50% of these MIB values as fulfilling the conditions for SISO MIB calculation.

For an embodiment of rank-2 MIMO MIB computation utilizing a plurality of neurons, organized in several hidden ANN layers with 4 inputs and 16 outputs, the computational complexity is as follows (in this and other examples, other numbers of inputs, output, activations, multiplications, and other factors may be used):

40 activations per 16 MIBs (2.5 per MIB)

384 multiplications per 16 MIBs (24 per MIB)

Where an activation refers to calculating a single result of a single neuron.

The computational complexity of a classifier performed by an ANN with few neurons, 3 inputs and 1 output is:

5 activations per 16 MIBs (0.31 per MIB)

16 multiplications per 16 MIBs (1 per MIB)

The computational complexity of a SISO MIB calculation performed by an ANN with few neurons, 1 input and 4 outputs is:

8 activations per 16 MIBs (0.5 per MIB)

20 multiplications per 16 MIBs (1.25 per MIB)

Since 50% of the MIB values were detected as fulfilling the conditions for SISO MIB calculation, 50% of the MIB values may be calculated using SISO MIB computations, while the other 50% of the MIB values may be calculated using rank-2 MIMO MIB computations. Thus, the average number of activations per MIB may equal:

$$\text{Avg. No. of Activations: } 0.5*(0.5+0.31)+0.5*(2.5+0.31)=1.81 \quad \text{(Equation 15)}$$

The average number of multiplications per MIB may equal:

$$\text{Avg. No. of multiplications: } 0.5*(1+1.25)+0.5*(1+24)=13.625 \quad \text{(Equation 16)}$$

The overall computational complexity is compared in example table 1.

TABLE 1 comparison of the overall computational complexity

| Scenario | Average number of activations per MIB | Average number of multiplications. per MIB |
|---|---|---|
| rank-2 MIMO MIB computations | 2.5 | 24 |
| reduced power method for calculating MIB | 1.81 | 13.625 |
| % reduction | −28% | −43% |

Figure 6:
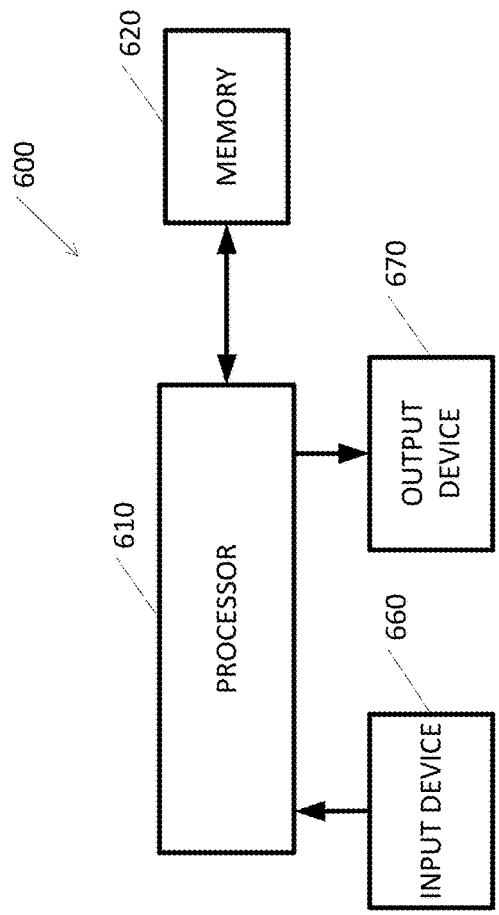
FIG. 6 is schematic illustration of an exemplary device according to embodiments of the invention.

Reference is made to FIG. 6, which is a schematic illustration of an exemplary device according to embodiments of the invention. A device 600 may be a computer device having a wireless communication capabilities, including for example, a UE, e.g., UE 120. Device 600 may include any device capable of executing a series of instructions, for example for performing the methods disclosed herein. Device 600 may include an input device 660 such as a mouse, a receiver, a keyboard, a microphone, a camera, a Universal Serial Bus (USB) port, a compact-disk (CD) reader, any type of Bluetooth input device, etc., and an output device 670, for example, a transceiver or a monitor, projector, screen, printer, speakers, or display.

Device 600 may include a processor 610. Processor 610 may include or may be a vector processor, a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 600 may include a memory unit 620. Memory unit 620 may be or may include any of a short-term memory unit and/or a long-term memory unit. Memory unit 620 may include, for example, random access memory (RAM), dynamic RAM (DRAM), flash memory, volatile memory, non-volatile memory, a tightly-coupled memory (TCM), a buffer, a cache, such as an L-1 cache and/or an L-2 cache, or other suitable memory units or storage units. Memory unit 620 may be implemented as separate (for example, "off-chip") or integrated (for example, "on-chip") memory unit, or as both.

Processor 610 may request, retrieve, and process data from memory unit 620 and may control, in general, the pipeline flow of operations or instructions executed on the data. Processor 610 may receive instructions, for example, from a program memory (for example, in memory unit 620 to perform methods disclosed herein. According to embodiments of the present invention, processor 610 may receive instructions to estimate MIB in MIMO systems and select a combination of TX parameters, [RI, PMI, CQI], as described herein.

Embodiments of the invention may be implemented for example on an integrated circuit (IC), for example, by constructing processor 610, as well as other components of FIG. 6 in an integrated chip or as a part of a chip, such as an ASIC, an FPGA, a CPU, a DSP, a microprocessor, a controller, a chip, a microchip, etc.

According to embodiments of the present invention, some units e.g., processor 610, as well as the other components of FIG. 6, may be implemented in a hardware description language (HDL) design, written in Very High Speed Integrated Circuit (VHSIC) hardware description language (VHDL), Verilog HDL, or any other hardware description language. The HDL design may be synthesized using any synthesis engine such as SYNOPSYS® Design Compiler 2000.05 (DC00), BUILDGATES® synthesis tool available from, inter alia, Cadence Design Systems, Inc. An ASIC or other integrated circuit may be fabricated using the HDL design. The HDL design may be synthesized into a logic level representation, and then reduced to a physical device using compilation, layout and fabrication techniques, as known in the art.

Embodiments of the present invention may include a computer program application stored in non-volatile memory, non-transitory storage medium, or computer-readable storage medium (e.g., hard drive, flash memory, CD ROM, magnetic media, etc.), storing instructions that when executed by a processor (e.g., processor 610) carry out embodiments of the invention. Processor 610 may be configured to carry out embodiments described herein by for example executing software or instructions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computer implemented method for selecting transmission (TX) parameters, the method comprising:
 a. receiving a wireless signal, the wireless signal comprising reference signals;
 b. generating a signal model for rank=2, based on reference signals of a received wireless signal;
 c. converting, using QR decomposition, the signal model to a four-parameter representation, wherein the QR decomposition comprises decomposing the signal model into matrices Q and R, wherein matrix Q is unitary and matrix R is an upper triangular matrix, wherein the four-parameter representation is derived from the upper triangular matrix R of the QR decomposition;
 d. determining, based on the four-parameter representation, whether mutual information per bit (MIB) values depend on a single parameter or on a plurality of parameters;
 e. if the MIB values depend on the single parameter, calculating MIB values based on the single parameter;
 f. if the MIB values depend on the plurality of parameters, calculating MIB values based on the plurality of parameters; and
 g. selecting TX parameters that provide a maximal expected throughput based on the MIB values.

2. The method of claim 1, wherein calculating MIB values based on the single parameter is performed using a machine learning algorithm.

3. The method of claim 1, wherein operations d and f are performed using a machine learning algorithm.

4. The method of claim 3, wherein the machine learning algorithm is an artificial neural network.

5. The method of claim 1, wherein operation f is performed using an artificial neural network, and wherein the artificial neural network provides a plurality of the MIB values in parallel.

6. The method of claim 1, further comprising:
   h. repeating operations d-f for a plurality of channel quality indications (CQI);
   i. repeating operations b-f for a plurality of pre-coder matrix indications (PMI);
   j. estimating required block error rate (BLER) values for combinations of PMI and CQI for rank=2 based on the calculated MIB values;
   k. estimating BLER values for combinations of PMI and CQI for rank=1; and
   l. selecting a combination of RI, PMI and CQI that provides a maximal expected throughput for which BLER is not greater than a predetermined value.

7. The method of claim 6, further comprising:
   m. reporting the selected combination of RI, PMI and CQI to the base station; and
   n. receiving data transmitted from the base station using the selected combination of RI, PMI and CQI.

8. The method of claim 1, wherein the wireless signal is transmitted over a multiple-input-multiple-output (MIMO) channel.

9. A computer implemented method for selecting transmission (TX) parameters, the method comprising:
   a. generating a signal model for rank=2, based on reference signals of a received wireless signal;
   b. converting, by QR decomposition of an effective channel matrix, the signal model to a four-parameter representation, wherein the QR decomposition comprises decomposing the signal model into matrices Q and R, wherein matrix Q is unitary and matrix R is an upper triangular matrix, wherein the four-parameter representation is derived from the upper triangular matrix R of the QR decomposition; and
   c. calculating mutual information per bit (MIB) values based on the four-parameter representation using an artificial neural network;
   d. selecting TX parameters that provide a maximal expected throughput based on the MIB values.

10. The method of claim 9, comprising:
    e. repeating operation c for a plurality of CQIs;
    f. repeating operations a-c for a plurality of PMIs;
    g. estimating required BLER values for combinations of PMI and CQI for rank=2 based on the calculated MIB values;
    h. estimating block error rate (BLER) values for combinations of pre-coder matrix indications (PMI) and channel quality indication (COI) for rank=1;
    i. selecting a combination of RI, CQI and PMI that provides a maximal expected throughput for which BLER is not greater than a predetermined value;
    j. reporting the selected combination of RI, CQI and PMI to the base station; and
    k. receiving data transmitted from the base station using the selected combination of RI, CQI and PMI.

11. A device for selecting transmission (TX) parameters, the device comprising:
    a memory;
    a processor configured to:
    a. generate a signal model for rank=2, based on reference signals of a received wireless signal;
    b. convert, using QR decomposition, the signal model to a four-parameter representation, wherein the QR decomposition comprises decomposing the signal model into matrices Q and R, wherein matrix Q is unitary and matrix R is an upper triangular matrix, wherein the four-parameter representation is derived from the upper triangular matrix R of the QR decomposition;
    c. determine, based on the four-parameter representation, whether mutual information per bit (MIB) values depend on a single parameter or on a plurality of parameters;
    d. if the MIB values depend on the single parameter, calculate MIB values based on the single parameter; and
    e. if the MIB values depend on the plurality of parameters, calculate MIB values based on the plurality of parameters;
    f. selecting TX parameters that provide a maximal expected throughput based on the MIB values.

12. The device of claim 11, wherein the processor is configured to calculate MIB values based on the single parameter using a machine learning algorithm.

13. The device of claim 11, wherein the processor is configured to perform operations c and e using a machine learning algorithm.

14. The device of claim 13, wherein the machine learning algorithm is an artificial neural network.

15. The device of claim 11, wherein the processor is configured to perform operation e using an artificial neural network, and wherein the artificial neural network provides a plurality of the MIB values in parallel.

16. The device of claim 11, wherein the processor is further configured to:
    g. repeat operations c-e for a plurality of channel quality indications (CQI);
    h. repeat operations a-e for a plurality of pre-coder matrix indications (PMI);
    i. estimate required block error rate (BLER) values for combinations of PMI and CQI for rank=2 based on the calculated MIB values;
    j. estimate BLER values for combinations of pre-coder matrix indications and CQI for rank=1; and
    k. select a combination of RI, CQI and PMI that provides a maximal expected throughput for which BLER is not greater than a predetermined value.

17. The device of claim 16, wherein the processor is further configured to:
    l. report the selected combination of RI, CQI and PMI to the base station; and
    m. receive data transmitted from the base station using the selected combination of RI, CQI and PMI.

18. The device of claim 11, wherein the wireless signal is transmitted over a multiple-input-multiple-output (MIMO) channel.

* * * * *